US008102068B1

(12) United States Patent
Gutekunst

(10) Patent No.: US 8,102,068 B1
(45) Date of Patent: Jan. 24, 2012

(54) BUOYANT IN-STREAM HYDRO TURBINE

(76) Inventor: Brent Lee Gutekunst, San Diego, CA (US)

( * ) Notice: Subject to any disclaimer, the term of this patent is extended or adjusted under 35 U.S.C. 154(b) by 357 days.

(21) Appl. No.: 12/396,470

(22) Filed: Mar. 3, 2009

(51) Int. Cl.
*F03B 13/10* (2006.01)

(52) U.S. Cl. ............... 290/53; 290/42; 290/43; 290/54; 415/3; 415/3.1; 415/4.5; 415/7; 415/8; 415/126; 415/906; 416/84; 416/85; 416/86; 416/170 R; 416/245 R; 417/330; 417/334; 417/337

(58) Field of Classification Search .......... 290/42, 290/43, 53, 54; 415/3, 3.1, 4.5, 7, 8, 126, 415/906; 416/84–86, 170 R, 245 R; 417/330, 417/334, 337
See application file for complete search history.

(56) References Cited

U.S. PATENT DOCUMENTS

| 658,968 | A | 10/1900 | Walter | |
|---|---|---|---|---|
| 2,097,286 | A | 10/1937 | McGee | |
| 4,239,976 | A | 12/1980 | Collard | |
| 4,264,276 | A | 4/1981 | Massey | |
| 4,872,805 | A | 10/1989 | Horiuchi | |
| 6,365,984 | B1 * | 4/2002 | Shu | 290/53 |
| 6,616,403 | B1 * | 9/2003 | Smith et al. | 415/3.1 |
| 7,042,113 | B2 | 5/2006 | Aukon | |
| 7,465,147 | B2 | 12/2008 | Platt | |
| 7,696,633 | B2 * | 4/2010 | Zajchowski et al. | 290/54 |
| 7,855,468 | B2 * | 12/2010 | Lin | 290/54 |

* cited by examiner

*Primary Examiner* — Asok Sarkar

(57) ABSTRACT

A buoyant hydro turbine(31) for capturing and utilizing energy in the currents of flowing water. A driven component (33) produces electricity or other energy is coupled to and supported by a buoyant rotor(64), increasing efficiency and eliminating the need for an independent supporting structure. Tethered in flowing water, the current(71) rotates the rotors (32) and transfers rotatable energy to the central driven component(33) where electricity or other mechanical work is produced. A number of embodiments are adapted for optimizing and maintaining positioning in a stream of moving water. Additional embodiments optimizing the efficiency and effectiveness of the turbine in capturing and utilizing the current's kinetic energy as well as hydrostatic pressure.

20 Claims, 17 Drawing Sheets

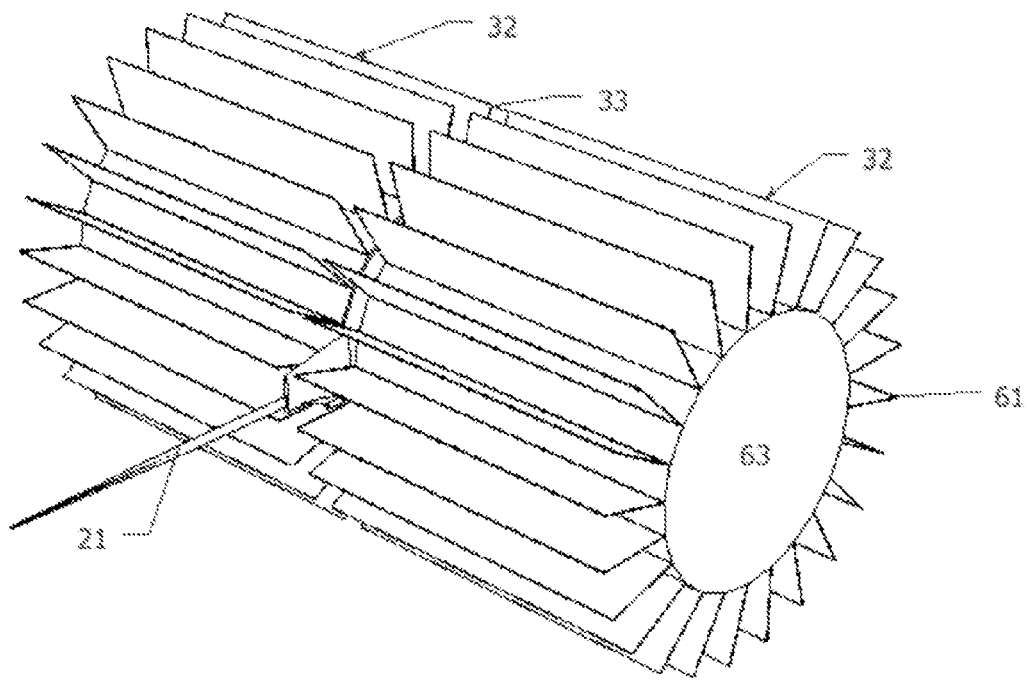
Fig 3a
Fig 3b
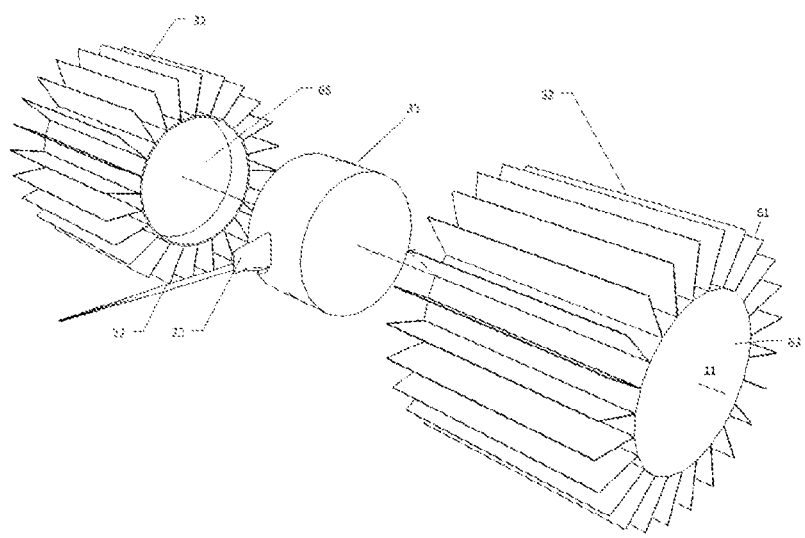

BUOYANT IN-STREAM HYDRO TURBINE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

The invention relates to buoyant water powered device for producing electricity or other mechanical work in areas of flowing water.

2. Information

This invention relates to a device that is designed to capture energy from existing currents of water and is particularly designed to operate while floating in-stream.

One of this planet's most common and readily available source of renewable energy is moving water. The power of Hydro kinetic energy is well known and well documented. It is abundant and is found in the vast quantities in every stream, river or other moving bodies of water. Its use and utilization is a function of economic and ecological constraints.

The most familiar methods for the utilization of this energy require dams, impounds or major civil works to contain and redirect the current. Making those methods inappropriate, or impractical for the majority, if not substantially all existing currents, for economic and ecological reasons. Therefore if this vast resource is to be accessed effectively and efficiently, existing currents must be utilized, while minimizing environmental and economic impacts.

A more economical and environmentally sensitive means for utilizing and capturing kinetic energy from existing currents are generally called free flow or in-stream hydropower. In many instances these in-stream devices require physical support from a structure, which is placed or attached to the river or stream's bed, or bank. This increases costs, perhaps disrupting navigation and the environment. Therefore are not viable options in many locations.

It is, therefore, a principal objective of this invention to substantially eliminate the need for the construction of any such civil works by positioning the device on the surface without fixed support structures. By floating, the invention substantially eliminates the need for such structures.

In other instances the water powered device is positioned in the current, through placement or attachment to a floating component, to provide support. These separate floating components add cost, complexity, and inefficiency. Because these floating components are subjected to the forces of the current they must effectively resist and dissipate that kinetic energy to remain in the desired position.

It is another object of this device to increase efficiency and effectiveness of converting the current's kinetic energy into usable power by integrating the required buoyancy into the device. Therefore reducing drag on the device, increasing its efficiency, and increasing the kinetic energy available to the turbine. Some of these floating water powered devices, integrate a floating component into the device. This too increases drag upon the device reducing efficiency.

Therefore it is another objective of the device to integrate the required buoyancy into the functional parts of the device to reduce drag and increase efficiency.

Many water-powered devices have employed propellers or water wheels that are substantially fully submerged in the water. Such devices must be positioned with their axis of rotation extending parallel to the direction of flow of the water. This is not a viable alternative in many circumstances. Requiring more depth of the current, and involving navigational and environmental concerns with debris and aquatic life providing a risk to the device and aquatic life alike.

It is a further objective of this invention to provide a buoyant water powered device that will not require to be completely submerged within the water.

All in-stream water powered devices must be held in a fixed position in the current to operate. In many cases theses devices may have multiple connections serving individual or multiple functions. Each additional connection requires additional effort to construct, install and maintain. Each additional connection increases the risk of entanglement with debris and aquatic life.

It is, therefore, a still further objective of this invention to provide an improved tether that can integrate multiple functionality with support for positioning the device, in an integrated single tether, serving as a single point of physical connection.

For maximum efficiency and water powered device must maintain its position relative to the current. In many alternatives this may include a support structure, or in the case of floating devices rudders, vanes and other single purpose additions.

It is another objective of this device to integrate features that maintained its position was so that the turbine's rotation is about an axis that is perpendicular to the current. These features will additionally contribute to the turbine's efficiency, debris avoidance and structural functionally.

In most in-stream surface based water powered devices are based upon the undershot water wheel and limited to hydrokinetic energy of the current.

It is another objective of this device to create hydro static pressure and utilize it in addition to the current's hydrokinetic energy, by the positioning of turbine, blades and the integration of the other parts.

3. Prior Art

By their nature, water powered devices must be positioned relative to the resource upon which they rely. Many are located or fixed to a permanent support structure such as a dam, pier, or foundation. Others are mounted to the ground or the bottom of the stream or river bed. One subset of water powered devices maintains their desired position by floating on the surface of the current or water source. This subset of floating surface-mounted, water powered devices encompass those devices that are attached to or mounted upon flotation components that contribute little or no functional value to the water-powered device, aside from providing support. Another set of floating water-powered devices integrate the flotation component into the device itself as, in the case of the device described in U.S Pat. No. 4,872,805. These articulated buoyant members contribute drag on the device, and do not contribute to the device's efficiency in capturing the kinetic energy delivered to the water powered device.

Some devices such as in another embodiment of U.S. Pat. No. 4,872,805 use the hydro dynamic force of the current to assist in maintaining the device's position, relative to the surface of the water. This too, fails to effectively utilize efficiently the Hydro kinetic energy placed upon, and delivered to, the device.

Another type of floating water powered device as disclosed in U.S. Pat. No. 7,042,113, a generator is placed in the drum that is rotated by moving water. This device requires multiple attachments to both sides of the drum at its axes and is affixed to a permanent structure. The placement of the generator within the drum of the water wheel, limits the flexibility of adjusting the device for various current conditions, and requires multiple attachments that increase the device's risk of damage or entanglement in debris. This is why the invention attaches the tether to a single point on the driven component at the midpoint of the rotor.

Existing buoyant or floating water powered devices such as water wheels or turbines, are of a type called undershot water wheels. These devices use the principle of impulse power in which only the kinetic power, or the strength of the current, is utilized. This invention the subject of this patent utilizes not only impulse power but also hydrostatic pressure. Hydrostatic pressure has been utilized with fixed rotary hydraulic pressure machines, with dams or other form of water retention. Hydrostatic Pressure results from higher water surface levels upstream to the turbine versus downstream. Because of this invention's distribution of buoyancy to the rotor, it allows for maximum force to develop over its' entire width of the turbine enabling a disparity in water level between the upstream and downstream side of the turbine. The invention's implementation of a single rotor with the major points of dissipation of the current's excess kinetic energy is limited to the rotor ends increasing the disparity of the water level and pressure between the upstream and downstream sides of the rotor. The rotor does have a gap for the attachment of the tether to the driven component, but it is or minimized size and with a ridge extending through the gap, the effect is effectively eliminated.

SUMMARY

This invention and associated embodiments pertain to a buoyant in-stream turbine. One embodiment of the invention comprises a buoyant rotor substantially enclosing a driven component and support component. In use, the device is placed in a body of moving water and held in desired location within the water by a tether. The tether has the means for transporting energy, materials or communications individually or in combination to and from the device and its anchorage. The moving water impacts the invention with kinetic energy and in turn, the build-up of hydrostatic pressure. This combination exerts force on the rotor's blades causing it to rotate. The rotational energy of the rotor is then transferred to the driven components, where it is utilized to create electricity or some other form of mechanical energy. The driven component is encircled by a ridge, which reduces the risk of entanglement with debris, serves as a vane in the water's current to maintain the turbines position perpendicular to the direction of the current, and in turn, increases the available hydrostatic pressure.

DRAWINGS

Figures

FIG. 3a is a perspective view of the an embodiment of the device

FIG. 3b is a partially exploded view showing the association of the device components.

Figure 4A:
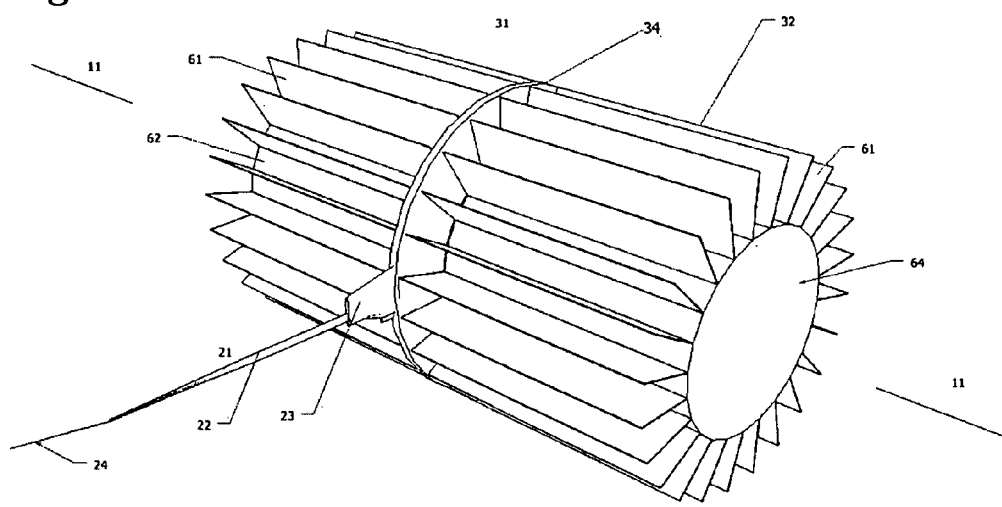
FIG. 4a is a perspective view of another embodiment of the device
Figure 4B:
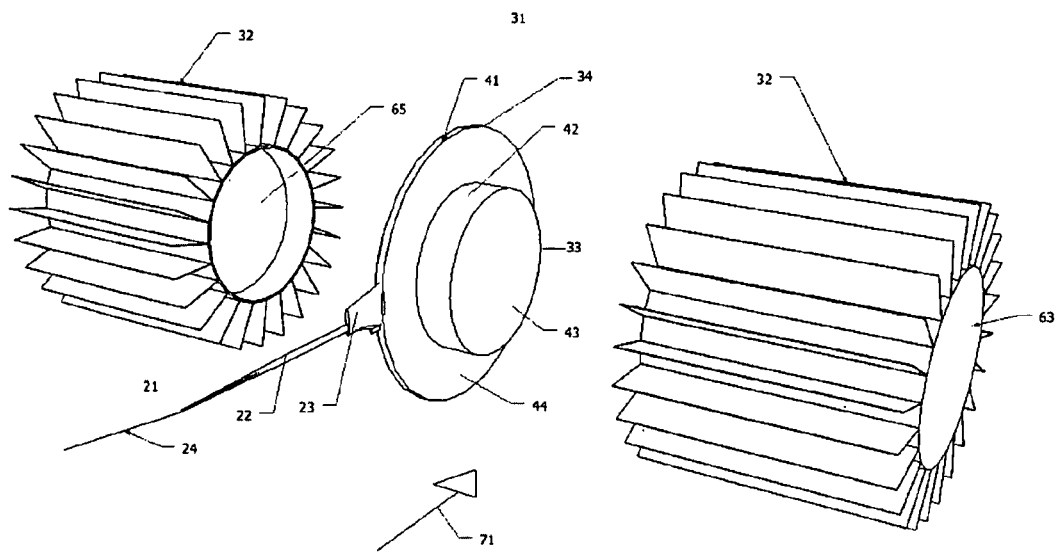

FIG. 4b. is a partially exploded view showing the association of the device components.

Figure 4C:
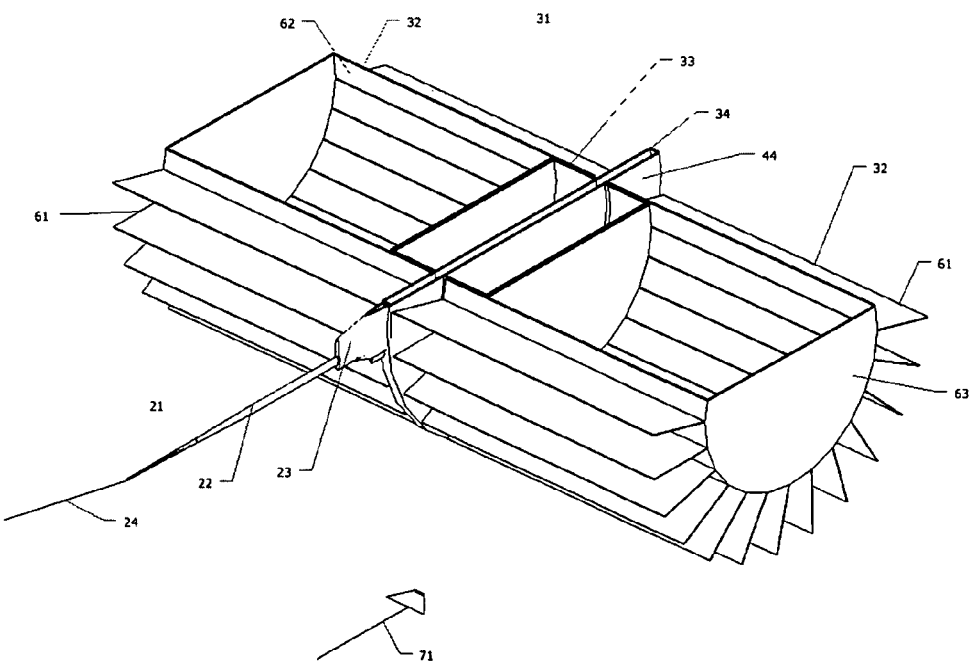

FIG. 4c. is a cross-sectional perspective view of the device.

Figure 4D:
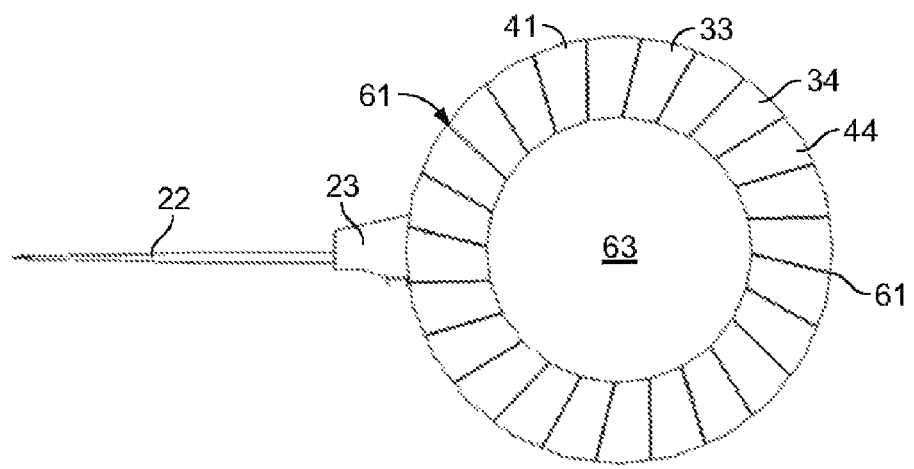

FIG. 4d is a side elevation view of the embodiment

Figure 5A:
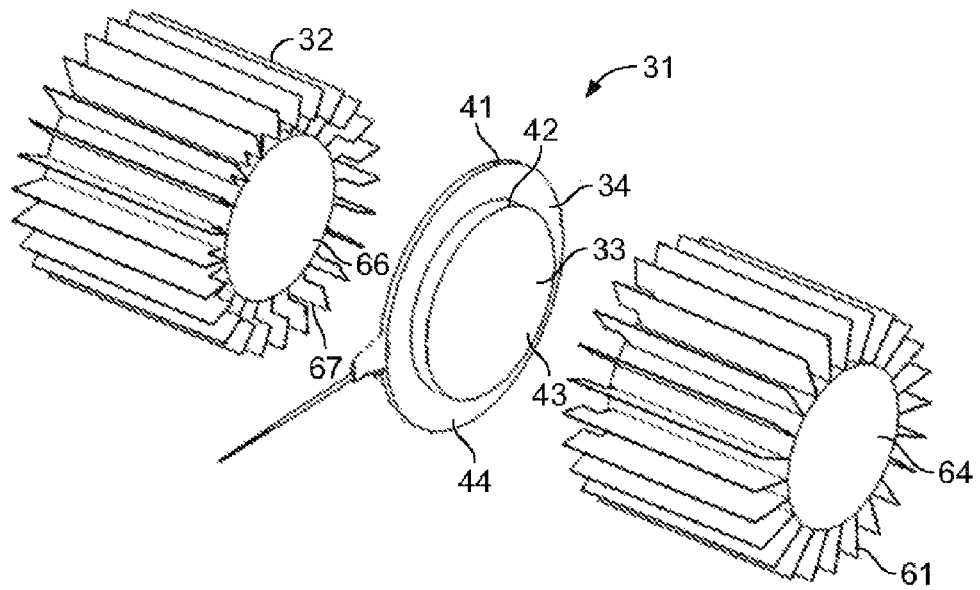
Figure 5B:
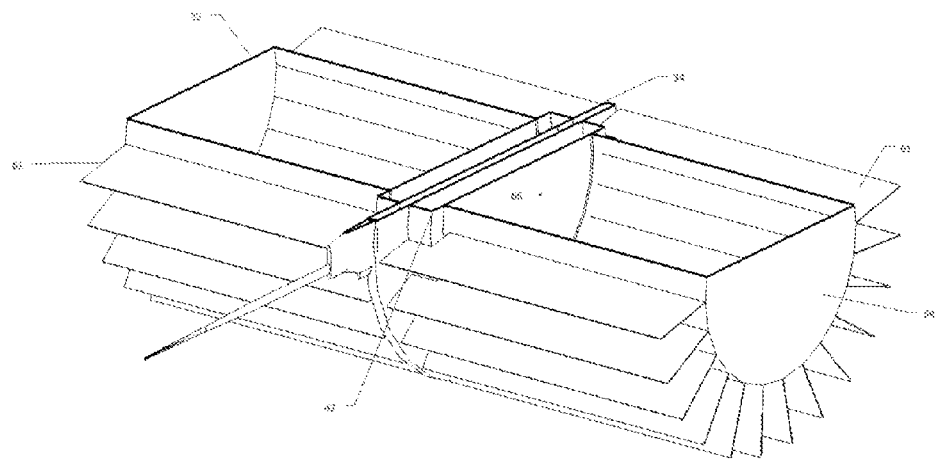
Figure 6A:
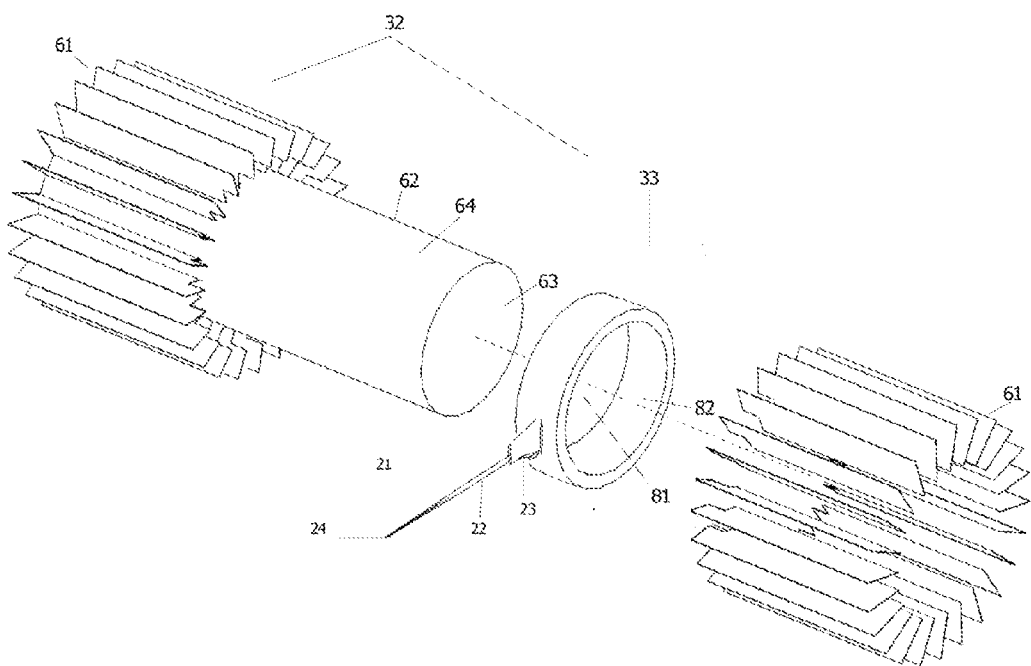
Figure 6B:
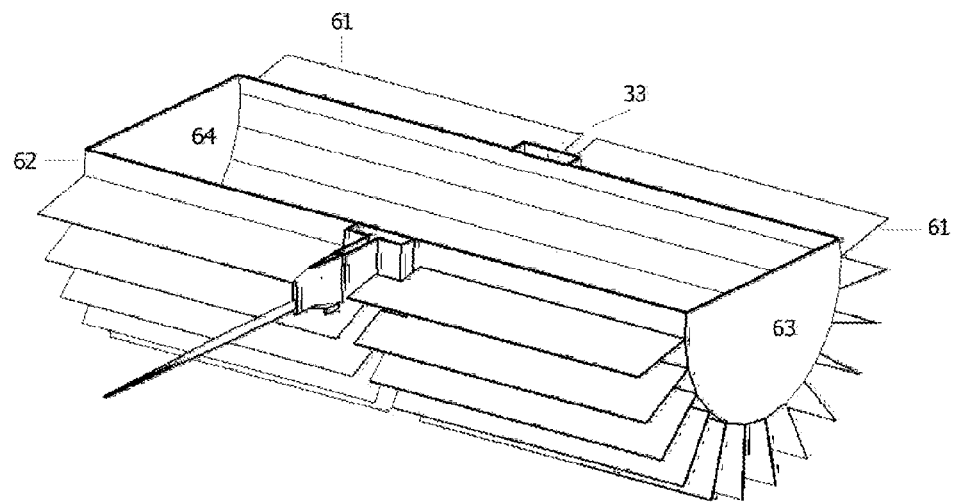
Figure 6C:
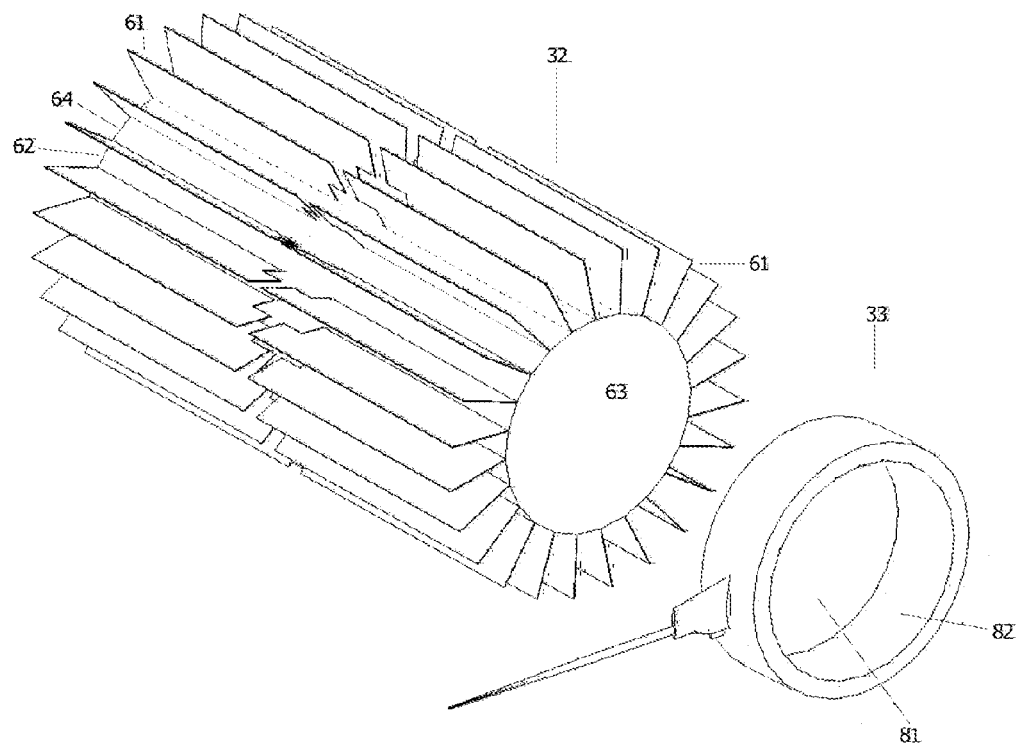
Figure 6D:
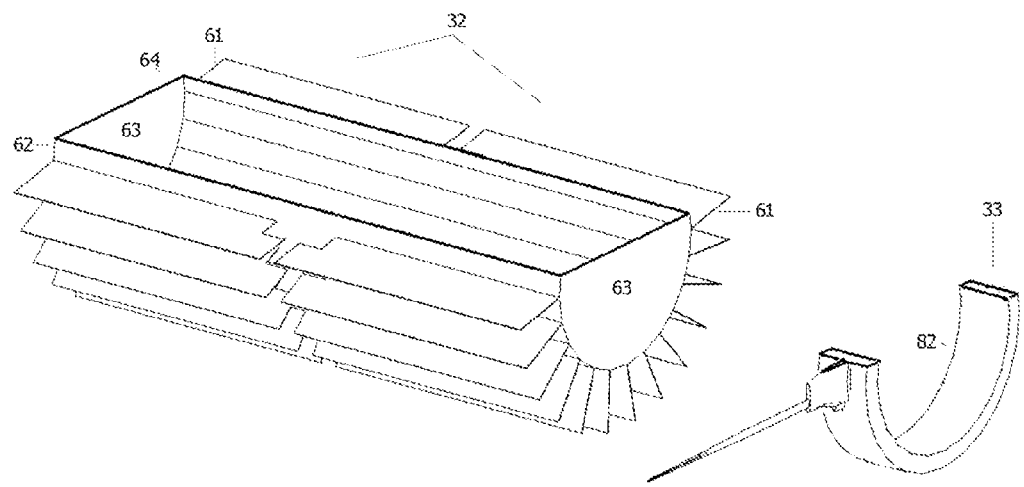
Figure 7A:
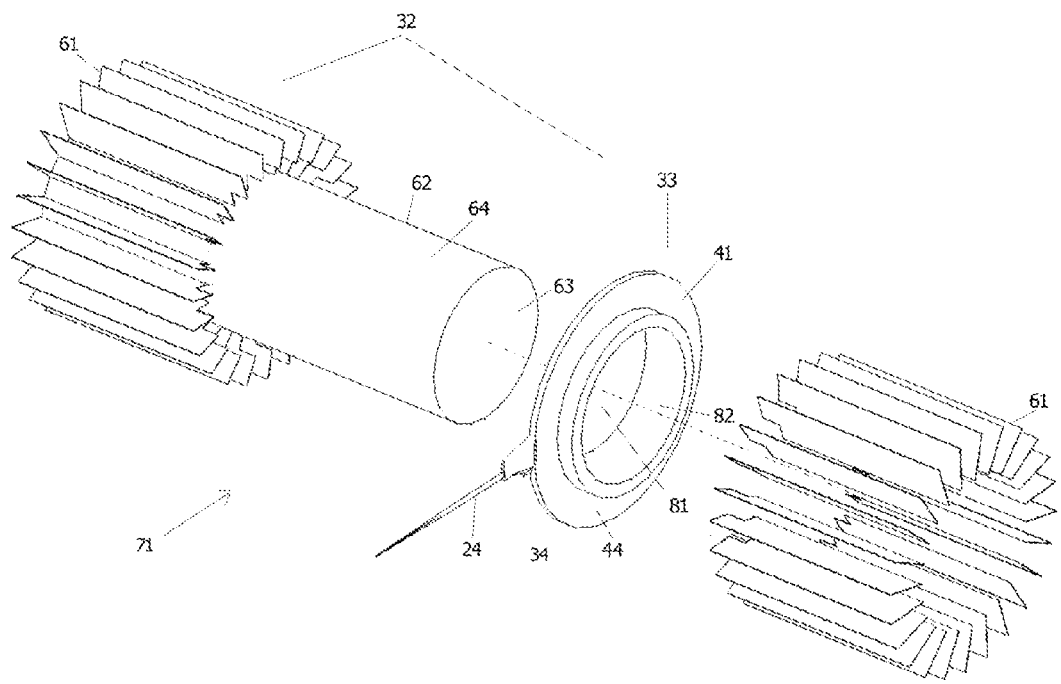
Figure 7B:
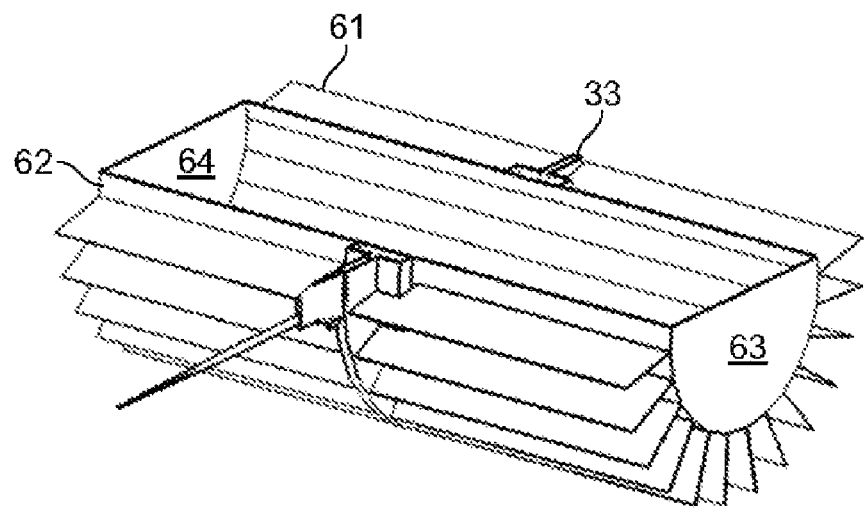
Figure 7C:
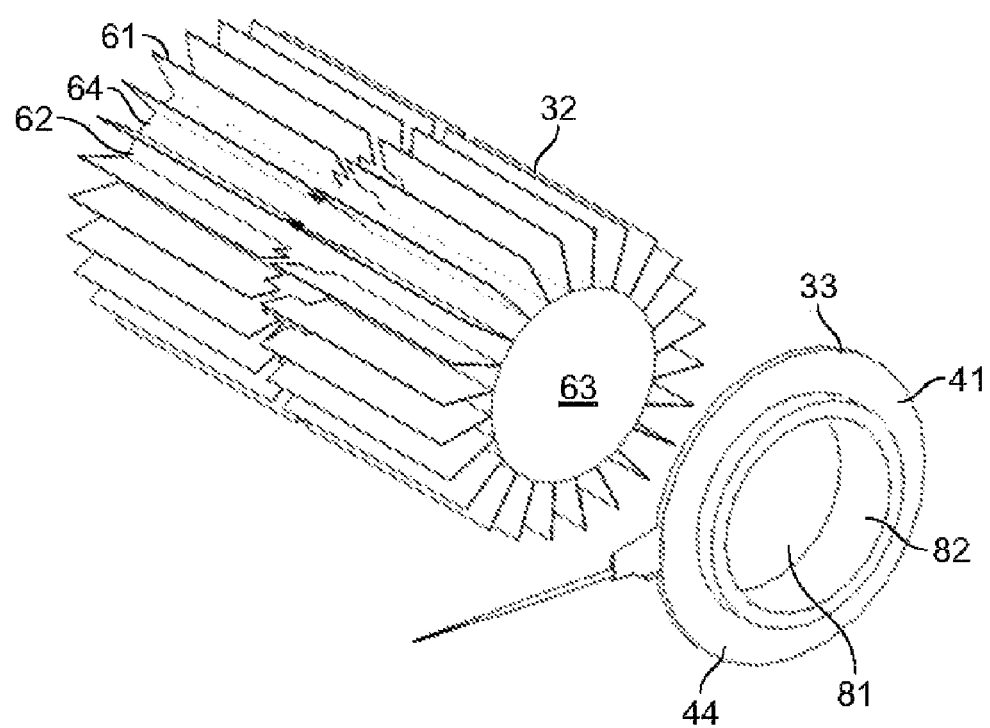
Figure 7D:
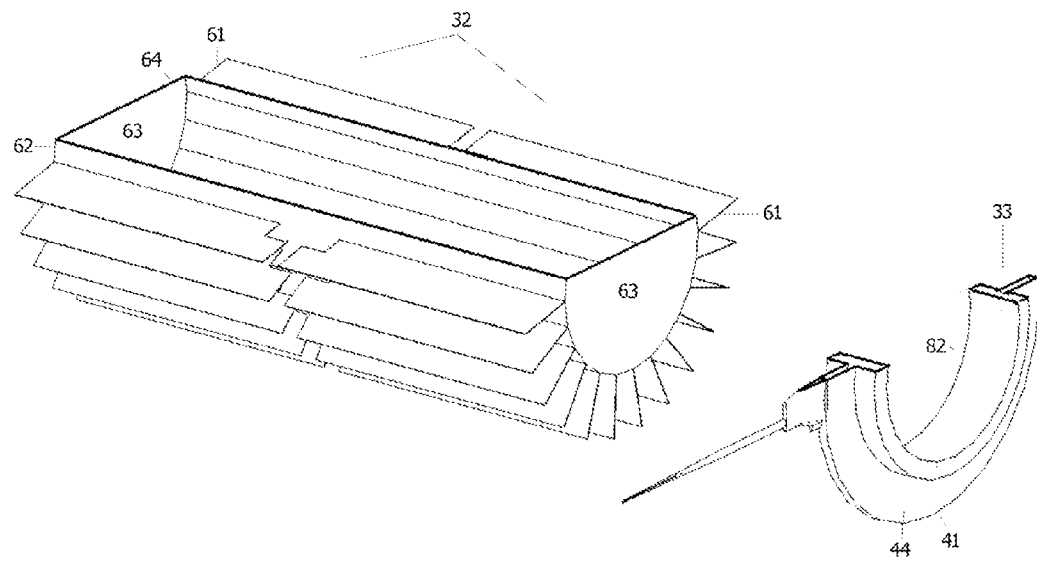
Figure 8A:
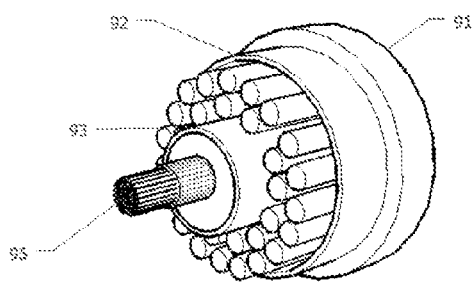
Figure 8B:
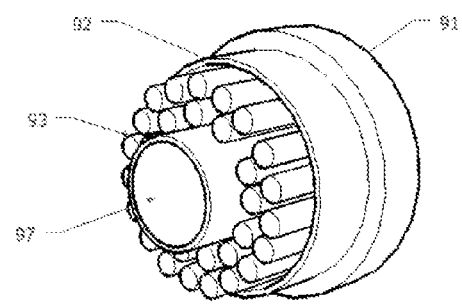
Figure 8C:
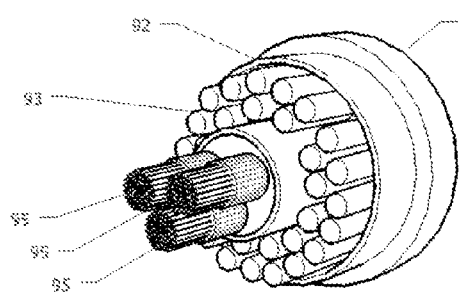
Figure 8D:
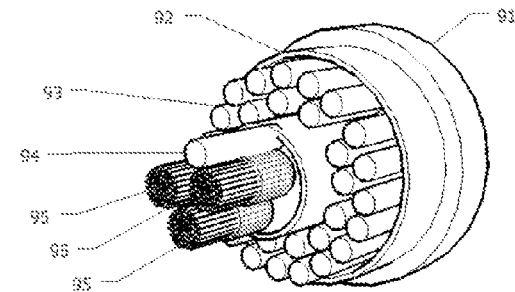
Figure 9:
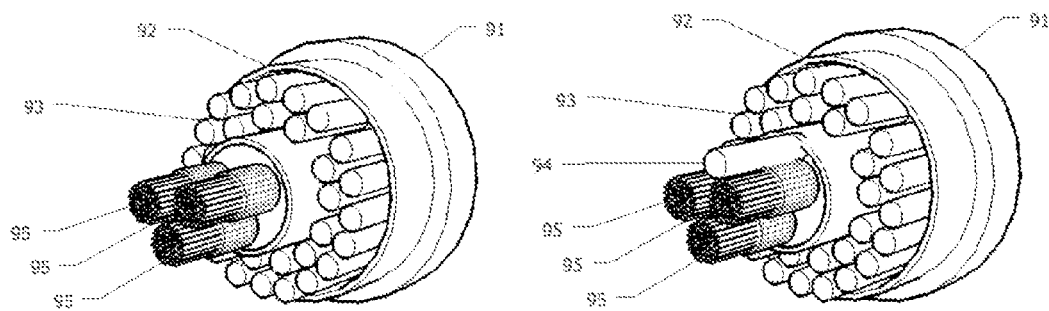
Figure 10:
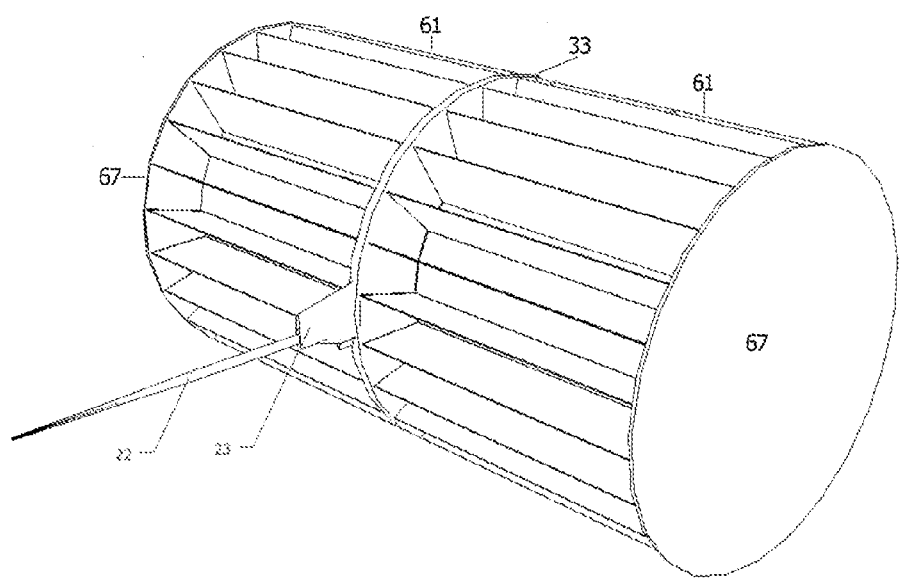

FIG. 5a is an exploded perspective view of another embodiment of the device and driven component FIG. 5b is a cross-sectional perspective view of the embodiment of FIG. 5a FIG. 6a is an exploded perspective view of another embodiment of the device FIG. 6b is a cross-sectional perspective view of the embodiment in FIG. 6a FIG. 6c is an exploded perspective view of the embodiment in FIG. 6b FIG. 6d is a cross-sectional perspective view of the exploded perspective view in FIG. 6c FIG. 7a is an exploded perspective view of another embodiment of the device FIG. 7b is a cross-sectional perspective view of the embodiment in FIG. 7a FIG. 7c is an exploded perspective view of the embodiment in FIG. 7b FIG. 7d is a cross-sectional perspective view of the exploded perspective view in FIG. 7c FIG. 8a, b, c, d is a perspective view of several embodiments of the tether FIG. 9 is a perspective view of another embodiment of the device FIG. 10 is a top plan view of the embodiments of FIG. 9

Figure 11:
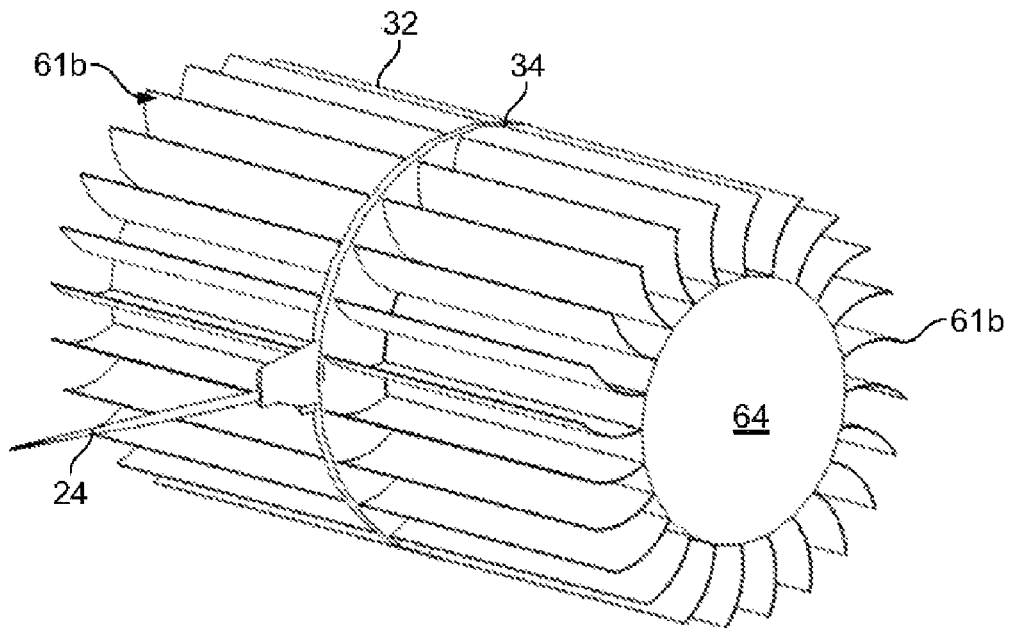

FIG. 11 is a perspective view of another embodiment of the invention

Figure 12:
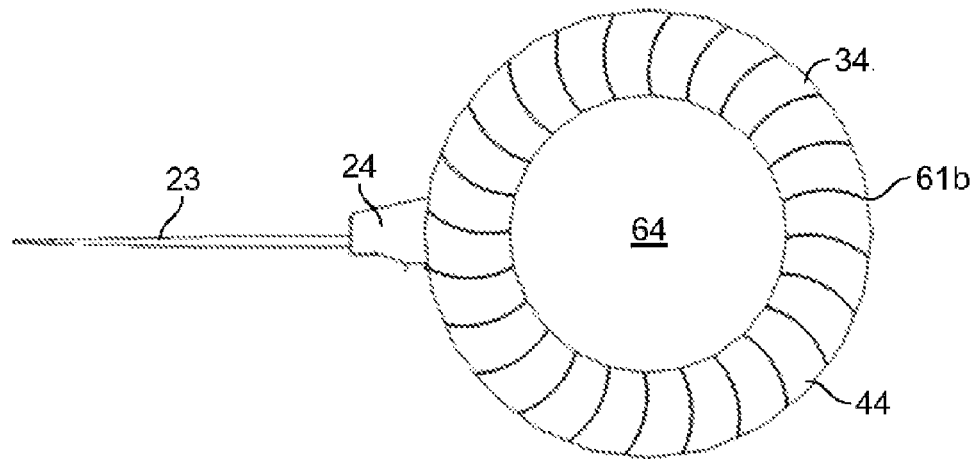

FIG. 12 is a side elevation view of the embodiment of FIG. 11

Figure 13:
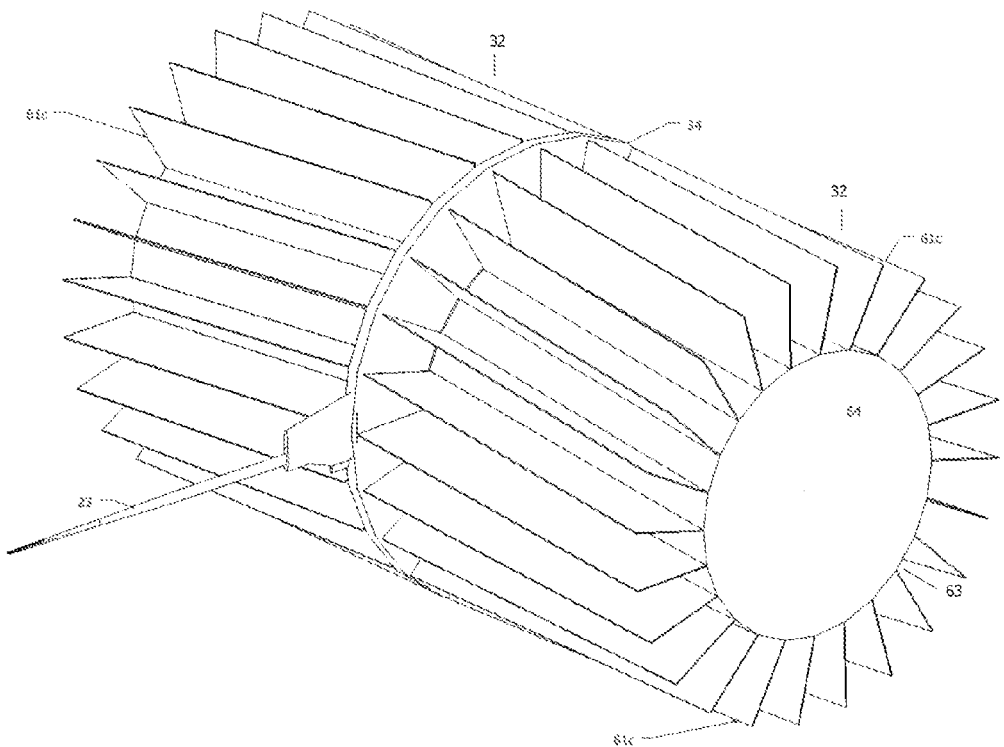

FIG. 13 is a perspective view of another embodiment of the invention

Figure 14:
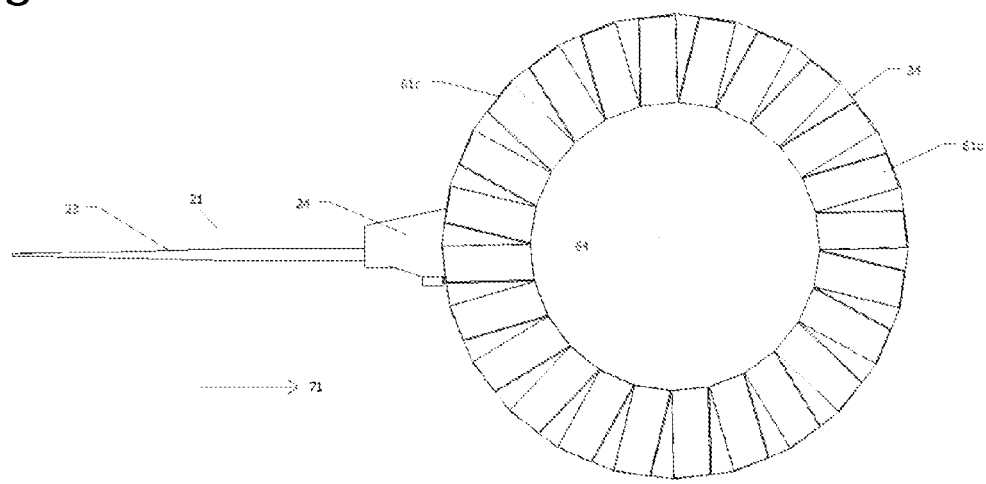

FIG. 14 is a side elevation view of the embodiment of FIG. 13

Figure 15:
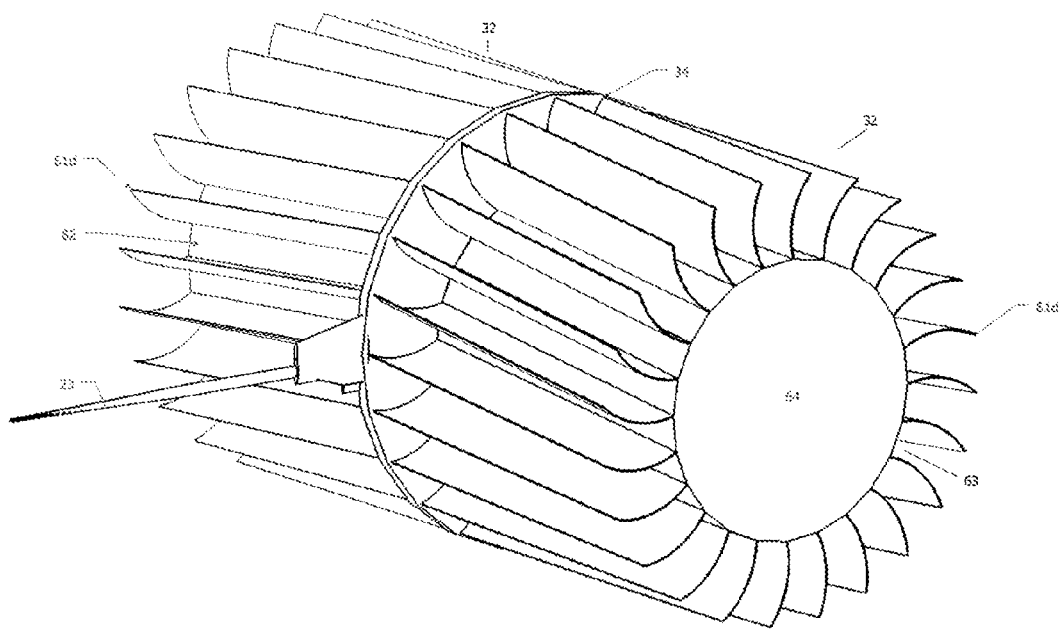

FIG. 15 is a perspective view of another embodiment of the invention

Figure 16:
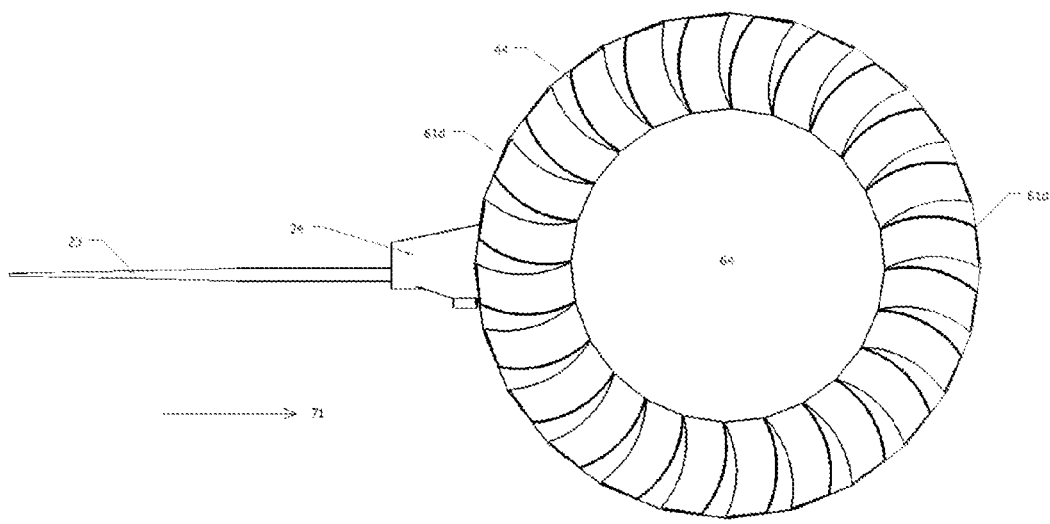

FIG. 16 is a side elevation view of the embodiment of FIG. 15

Figure 17:
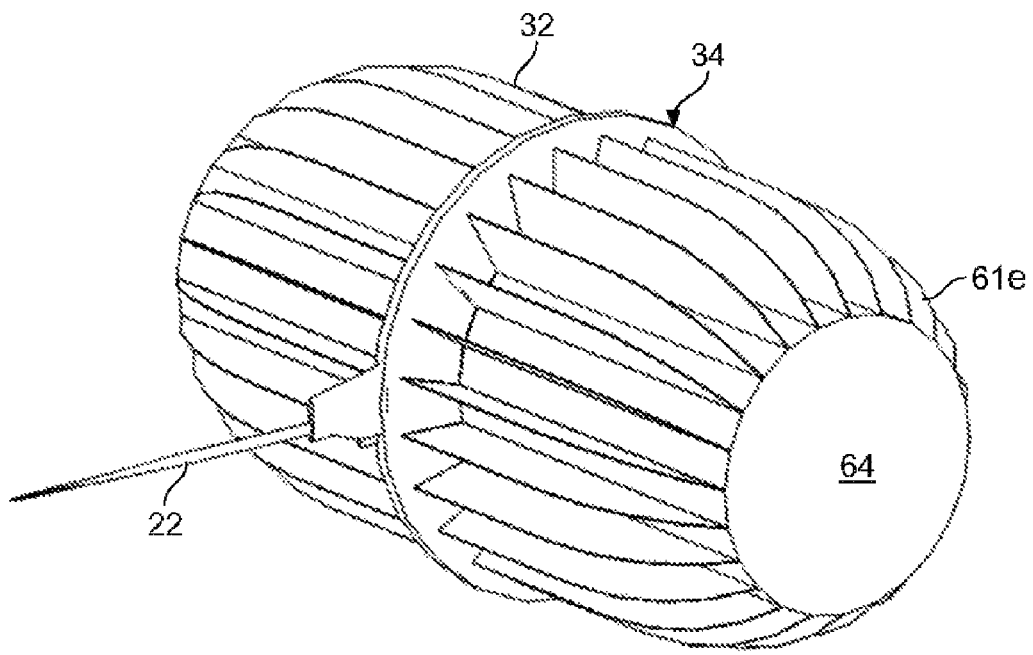

FIG. 17 is a perspective view of another embodiment of the invention

Figure 18:
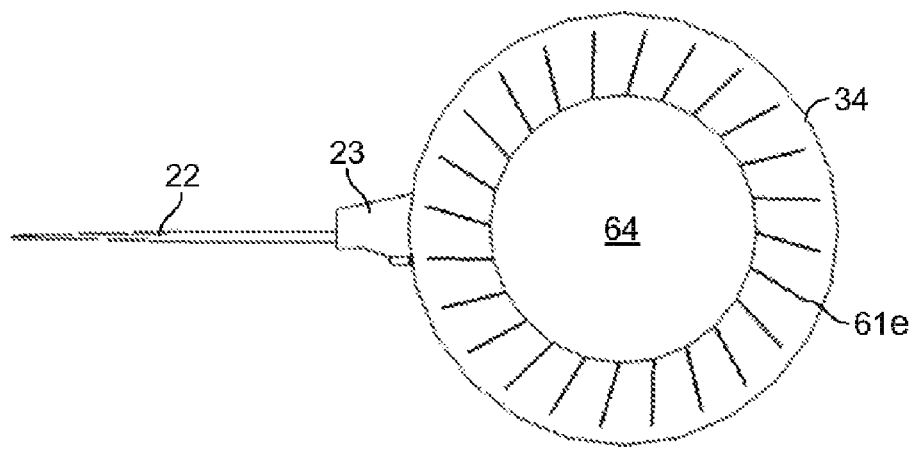

FIG. 18 is a side elevation view of the buyer embodiment of FIG. 17

Figure 19:
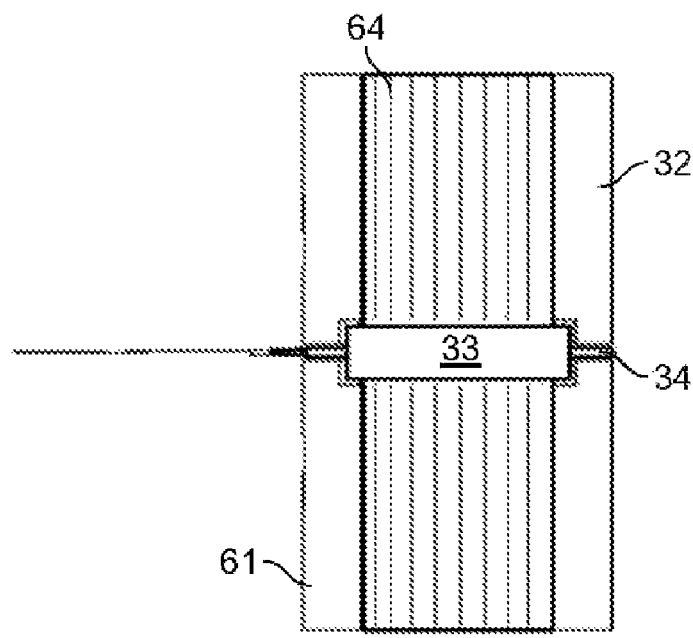
Figure 20:
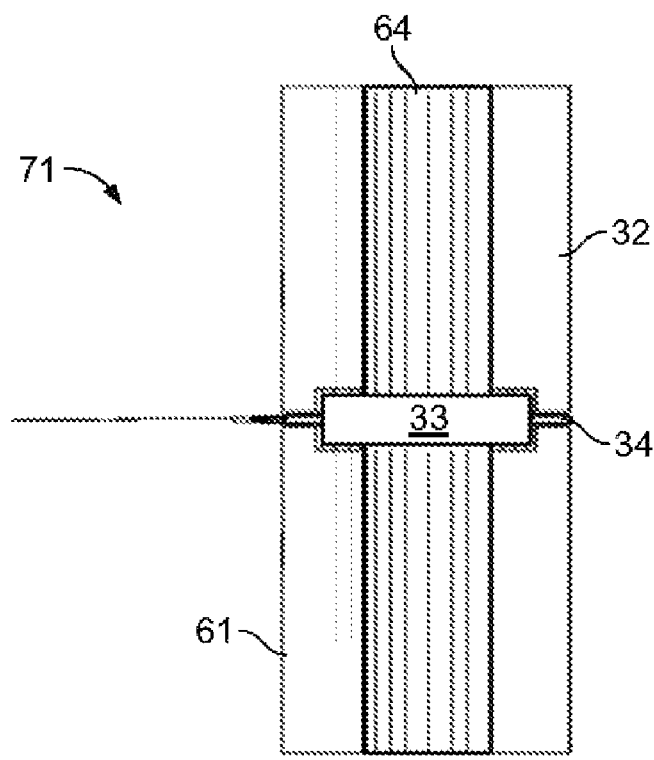

FIG. 19 is a top plan view cross-sectional taken through the axis of the invention of an embodiment FIG. 20 is a top plan view of the cross-sectional taken through the axis of the invention and displaying another embodiment of the invention along the lines of FIG. 19

DETAILED DESCRIPTION OF THE PREFERRED EMBODIMENTS

While the invention is susceptible to various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 1:
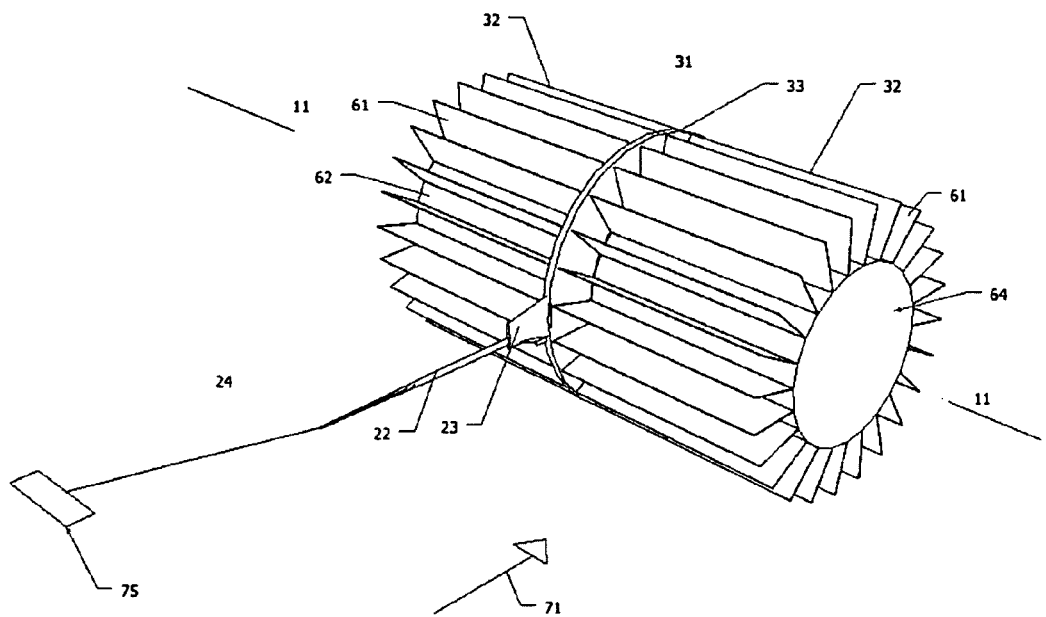
FIG. 1 is a perspective view showing water powered device constructed in accordance with this invention as placed in a current of water.

The present invention is a buoyant turbine for generating power from water currents. In FIG. 1, a perspective view of the first embodiment of the present invention identified by reference numeral 31, is shown in a current in a body of water, such as a stream, river, or tidal flow identified by reference numeral 72. The current flows in the direction of the arrow 71. The invention 31, includes a water driven rotor 32, which drives the Driven Component, indicated generally by the reference numeral 33 and which may comprise an electrical generator or other means of transforming the rotational energy from the rotor into mechanical energy, upon the water current 71 through the rotors 32, in a manner to be described. The assembly consisting of the rotor 32 and the driven component 33 about an axis indicated generally by the reference number 11. In FIG. 1, the device 31 is positioned in the current 72 by means of tether assembly indicated generally by the reference number 21. The tether 21 is in turn attached to an anchorage 75.

In FIG. 1 the operation of this embodiment will now be described. The device 31 is placed in a body of water 73 with a current 71. The device 31 is held in its relative position in the current 71 by a tether 21 attached to an anchorage 75, and in turn attached to driven component 33. The device 31 maintains a relative position to the surface of the water 72 substantially from the buoyancy provided by rotor 32. The device's 31 position relative to the surface of the water 72 is to maximize the usable energy available to device 31, while minimizing un-usable kinetic energy or drag on the device 31. The current 71 will create hydrodynamic forces causing the rotor 32 to rotate about the axis 11. The device 31 has the means to transfer the resulting rotatable energy from the rotor 32 to the driven component 33. The driven component will use utilize the rotatable energy to create electricity or some other form of mechanical work.

Figure 2:
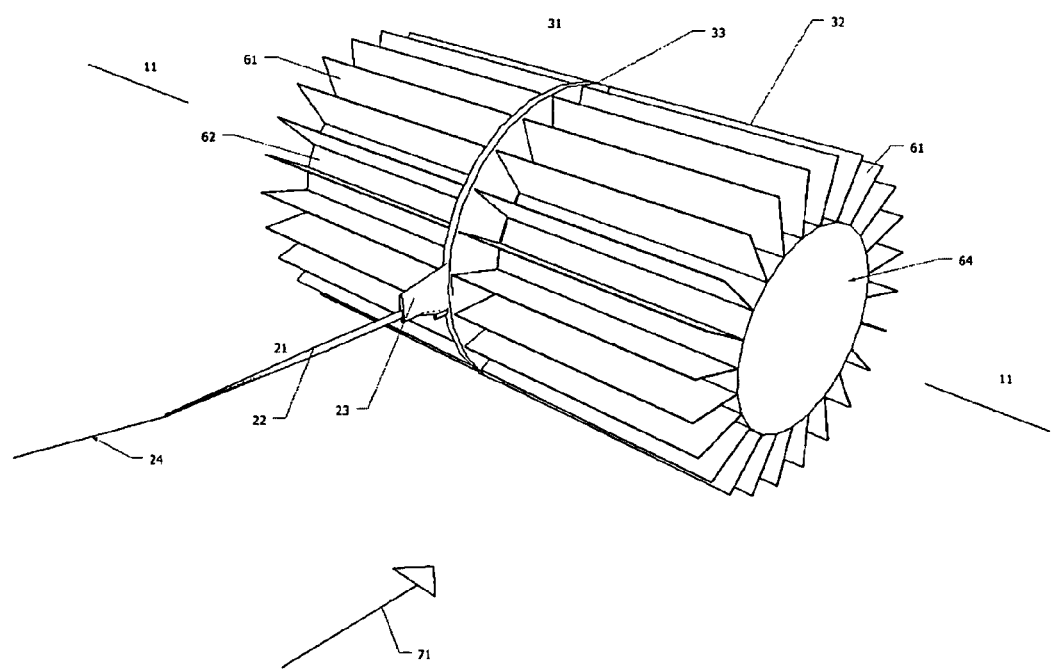
FIG. 2 is a perspective view of the device shown in FIG. 1.

In FIG. 2 an embodiment of the invention, the rotor 32 comprises a hub 64 of cylindrical shape and providing substantially all of the required buoyancy for supporting the invention. The rotor has a plurality of blades 61 attached to the radial surface 62 of the hub 64. The rotor 32 comprises a means of coupling to the driven component 33, extending perpendicular to the current 71 and rotating around the device axis 11. The rotor 32 substantially encloses the driven component 33, substantially eliminating any kinetic energy from being placed on the driven component 33 by the current 71.

Figure 3C:
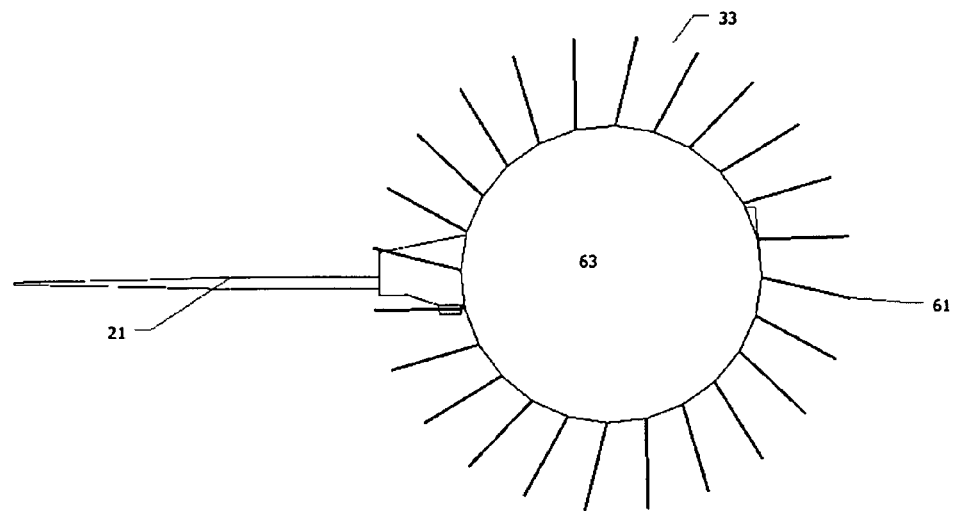
FIG. 3c is a side elevation view of the embodiment

As viewed in FIG. 3a, 3b, 3c, this embodiment of the driven component 33 is smaller in diameter and in depth than the cavity 65 in the rotor's 32 hub 64. The driven component 33 is substantially nested in the cavity 65, in the rotor's 32 hub 64, substantially encasing the drive component 33 within the cavity 65 in hub 64. In this embodiment the rotor 32 is coupled with the driven component 33 and rotates about an axis 11. The rotor 32 transfers rotatable energy to driven component 33 where it is utilized to produce electricity or some other form of energy.

As viewed in FIG. 3a, 3b, 3c, in this embodiment of the invention there is a single connection to the invention. The tether 21 attaches to the driven component 33. In turn the tether 21 is attached to anchorage 75. The tether 21 comprises the point of connection 23 to the driven component 33. A component of the tether 21 is a rigid components 22 extending from the point of connection 23 for a length before connecting to the tether cable 24. This ridged portion 22, reduces the risk of entanglement with rotatable portions of the invention, specifically the rotor 32 and its blades 61.

In FIG. 4a, 4b, 4c, 4d an additional embodiment of this invention, the drive component 33 comprises an encircling ridge positioned parallel to the current 71. The ridge 34 has a face 44 with a height that enables the ridge perimeter edge 41, to be substantially equal or greater than the rotational diameter of the rotor 32, including the rotor's hub 64 and Blades 61. The ridge 34 reduces the risk of fouling the device 31 with aquatic debris that might become entangled, wedged between the rotatable portions of the device 31, such as the rotor 32 and the non-rotatable portions components including the driven component 33, the ridge 34 and the tether 21. The ridge 34 acts as a vane in the current 71 and maintains the rotor 32 position perpendicular to the current 71. The ridge 34 also increases the Hydrostatic energy by decreasing the water level 72 on the downstream side of the device 31, relative to the water level upstream from the invention.

In FIG. 6a, 6b this embodiment the driven component 33 is larger in diameter than the rotor's 32 hub 64. A portion of the driven component's 33 cylindrical face 42 is external to the rotor 32 hub 64. The rotor's 32 blades 61 are notched 67 to accommodate the portion of driven component 33, which extrudes beyond the hub's 64 inside cylindrical perimeter 66. The rotor's 32 blades 61 substantially encase the driven component 33.

As viewed in FIG. 7a, 7b, 7c, 7d, this embodiment the driven component 33 encircles the rotor 32 hub 64. The driven component 33 has an opening 81 in which the rotor 32 hub 64 is positioned. The driven component 33 is positioned approximately midway on the length of hub 64 so that approximately half of the rotor 32 extends on each side of driven component 33. The tether 21 is attached to driven component 33.

In FIG. 7b the embodiment's tether 21 serves as the only physical connection to the invention. The tether 21 attaches to the driven component 33 at 23, which is connected to rigid portion 22. The rigid component 22 reduces the risk of entanglement of the tether 21 with the invention's rotatable parts, the rotor 32 and its blades 61.

In FIG. 7c, 7d of this embodiment, the rotatable component of the invention, which is the rotor 32, is shown in an exploded and cross-sectional exploded view, separated from the non-rotatable component including the driven component 33 and the attached tether 21.

In FIG. 8a, 8b, 8c, 8d an additional embodiment to the embodiment discussed and demonstrated in FIG. 7a,b,c,d of this invention the drive components 33 comprises an encircling ridge 34, positioned parallel to the current 71. The ridge 34 has a face 44, with a height is such that the ridge perimeter edge 41, is substantially equal or greater than rotatable diameter of the rotor 32, including the rotor hub 64 and Blades 61. The ridge 34 reduces the risk of fouling the device 31 with aquatic debris that might become entangled, wedged between the rotatable portions of the device 31, such as the rotor 32 and the non-rotatable portions components including the driven component 33, the ridge 34, and the tether 21. The ridge 34 acts as a vane in the current 71 and maintains the rotor 32 position perpendicular to the current 71. The ridge 34 also increases the Hydrostatic energy by decreasing the water level on the downstream side of the rotor 32 relative to the upstream water.

In FIG. 10a,b,c,d another embodiment of the invention the tether, incorporates the means for transport items such as materials, energy or communication to and from the invention. To accomplish this the tether, may comprise multiple functions. In FIG. 10a embodiment of the tether incorporates a coaxial cable 95 for the transport of electricity or communications to and from the invention and the anchorage. Steel strength cables 93 surround the coaxial cable 95, providing the strength required to position the invention in the current. These cables are finally wrapped in a buffer tube 92 and an outer jacket 91. The FIG. 10*b* embodiment of the tether incorporates a hose 97 for transporting fluids such as air or water under pressure to and from the invention. This hose 97 is incorporated within the steel strength cables 93 encased in a buffer tube 92 and an outer jacket 91. The embodiment of the tether demonstrated in FIG. 10*c* comprise multiple electrical cables 95 providing a positive, negative a ground cable, incorporated within the steel strength cables 93 encased in a buffer tube 92 and an outer jacket 91. FIG. 10*d* embodiment suggests the ability of multiple functions by combining the electrical functionality of FIG. 10*c* with an Optical fiber 94 provide communication ability with the invention.

As viewed in FIG. 15, 16 this embodiment of invention, the rotor 32 has a disc 67 attached to or incorporating the ends of the hub, which is furthest away from the driven component 33. This disc 67 is parallel to the current 71. The disc 67 has a diameter substantially equal or greater than that of rotor 32 including the rotor hub and blades 61. Disc 67 reduces the risk of fouling from aquatic debris that may become entangled, or wedged in Blade 61. Blades 61 may or may not be attached to disc 67, if attached to the disc 67 they may provide additional structural strength and support. Disc 67 will provide additional protection to Blades 61 and hub 64 from aquatic debris. Disc 67 will also act as a vane in current 71, helping to maintain the invention's position to the current 71.

In FIG. 17, 18 this embodiment of the invention, the rotor 32 blades 61*b* contain a concave side on the portion of the blade facing the current 71. The concave shape of Blades 61*b* will increase the efficiency at which Hydro kinetic energy is captured from the current 71, and increases the force on said Blades 61*b* exerting greater torque on rotors 32 hub 64 increasing rotational speed and torque. The concave shapes of blades 61*b* also increase the hydrostatic pressure available to invention to be utilized by rotor 32, by increasing the pressure disparity upstream to the invention versus the lower pressure found on the downstream.

In FIG. 19, 20 this embodiment of the device, the rotor 32 blades 61*c*, are radially twisting on the rotor 32 hub 64. The radial twisting or angling of said Blades 61*c* decreases the chance of entanglement at points where the rotatable portions of the device 31 come close to non-rotatable portions of device 31, including but not limited to tether 21. Operationally the radial twisting of blades 61*c* about hub 64 increases the hydrostatic pressure available to rotor 32 by directing a portion of current 71 towards the outside ends of hub 63. This increases the relative water level on the upstream side of the rotor 32, while decreasing relative water level on the downstream side. In addition this configuration increase the water power's stability and ability to remain optimally positioned relative to the current by increasing the currents force on the upstream side of the turbine and decreasing the force on the down stream side, having the effect of forcing the turbines into they preferred perpendicular position.

In FIG. 21, 22 this embodiment of the device, the rotor 32 blades 61*d* combine a concave face on the side facing current 71 and are radially twisting about hub 63. This combination of the prior embodiments further increases the efficiency in utilizing hydrostatic and hydro pressure to create usable energy.

In FIG. 23, 24 this embodiment of the device, the rotor 32 blades 61*e* have a rounded corner on that potion located furthest away from the driven component 33. This reduces risk to the invention and specifically the blade 61*e* from debris. It also reduces the damage that might occur to another object such as marine life if the blade 61*e* corner would come in contact it.

In FIG. 25, 26 is an additional embodiment of this invention, the rotor 32 may be modified to reflect the environmental conditions of the current that it is positioned, and the requirements of the driven component. In one embodiment of the driven component 33, the rotor 32 may incorporate a hub 64 that is smaller in diameter to increase the rotational speed of the hub 64. The rotor 32 may be replaced with one with a larger diameter of hub 64 to reduce rotational speed in the same current. The rotor 32 hub 64 may be lengthened to provide additional buoyancy or shortened to reduce the buoyancy. The blades 61 may be lengthened or shortened to increase or decrease the desired surface area to come in contact with current 71.

CONCLUSIONS, RAMIFICATIONS, AND SCOPE

Accordingly, the reader will see that the various embodiments of the buoyant in-stream hydro turbine offers greater efficiency in capturing energy from a current will reducing environmental and operational costs, such as additional support structures or other infrastructure. Furthermore, the buoyant in-stream hydro turbine has additional advantages in that:
  risk to the invention or marine life or object is reduced through embodiments including a single unified tether and rounded blade ends;
  increased efficiency by reducing or eliminating drag on non rotatable parts;
  increased utilization of the current's energy by restricting buoyancy to the rotor and increasing rotatable energy;
  to maximizes the efficiency of a given driven component by allowing flexibility in rotor permutations to reflect the environmental conditions in which the turbine is to be placed.

I claim:
1. A buoyant water powered device to be positioned in water and powered by the current, said device comprising:
  a) a driven component comprising:
    1. a device for utilizing rotational energy,
    2. a non rotatable water tight housing,
  b) a rotor component comprising:
    1. a hub with a plurality of blades radially mounted on the hub surface,
    2. being rotatable about an axis perpendicular to the current,
    3. substantially all of the buoyancy of the said device provided by a group consisting of the hub and blades,
  c) the positioning of the driven component at the approximate midpoint on the rotor axis and substantially within the rotor with approximate equal portions of the rotor located on opposing sides of the driven component,
  d) a gap in the rotor providing for coupling of a tethering component directly to the driven component,
  e) in combination, said device having a rotor and means for coupling rotational energy from said rotor to the driven component whereby the water powered device is positioned on the water surface in a current which produces a force on the blades in turn rotate the rotor which transfer the rotational energy to the driven component.
2. A water powered device as set forth in claim 1 wherein the hub of said rotor is continuous through an opening in the driven component, wherein the hub of said rotor further comprised of a single integrated unit encircled by the driven component and extending on both sides of the rotor hub.

3. A water powered device as set forth in claim 1 wherein the hub of said rotor provides substantially all of said device buoyancy, whereby eliminating any additional support to maintain the position of said water powered device relative to the surface of the water.

4. A water powered device as set forth in claim 1 with a tether from an anchorage to said device providing the only physical connection to said device, whereby reducing costs and risk of entanglement with debris.

5. A tether as set forth in claim 4 comprising:
   a) a connection to an anchorage to position such device in a current of water;
   b) a device for transporting items to and from said water powered device, whereby minimizing the number of physical connections to said device.

6. A tether as set forth in claim 4 comprising a means of rigidity for a portion of said tether extending from the point of connection with the drive component, whereby reducing the risk of entanglement of the tether and the water powered device.

7. A water powered device as set forth in claim 1 wherein the said driven component is substantially encircled by a ridge where said ridge is parallel to the water and positioned in the gap between both portions of the rotor, whereby reducing the risk of entanglement of debris in said device and utilizing the hydrodynamic force of the current as a vane to maintain the turbine's position perpendicular to the direction of the current and increase the available hydrostatic pressure.

8. A water powered device as set forth in claim 1 wherein the rotor component comprises a disc located on the outer points of the rotor's axis and parallel with the current encompassing the outer edge of the blades wherein the surface area of the disc is substantially same or greater than the surface area of the rotor blades.

9. A water powered device as set forth in claim 1 wherein the portion of the blades located furthest from the water driven component and furthest from rotor hub is rounded.

10. A water powered device as set forth in claim 1 wherein the blades are radially twisting on the rotor hub.

11. A water powered device as set forth in claim 1 wherein the surface of the blades facing the current is concave.

12. A water powered device as set forth in claim 1 wherein the device may replace the hub with one of a different diameter, whereby reflecting the attributes of the current and the requirements of the driven component, such that a larger diameter would provide a lower number of revolutions per minute and a smaller diameter a higher revolutions per minute.

13. A water powered device as set forth in claim 1 wherein the device may replace the hub with one of a different length, whereby reflecting the attributes of the current and the requirements of the driven component, such that a longer hub may provide for greater buoyancy and a shorter may provide less buoyancy.

14. A water powered device as set forth in claim 1 wherein the device may replace rotor blades with those comprising a different length or width, whereby reflecting the attributes of the current and the requirements of the driven component, such that a deeper blade will provide a larger surface area to interact with the current.

15. A water powered device to be positioned in water and powered by the current, said device comprising:
   a) a rotor component comprising:
      1. a hub with a plurality of blades radially mounted on the hub surface;
      2. being rotatable about an axis perpendicular to the current;
      3. substantially all of the support required to position said device on the water surface provided by a group consisting of the hub and blades;
   b) a non rotatable driven component comprising:
      1. a device for utilize rotational energy;
      2. a water tight housing;
   c) the said driven component substantially encircling the approximate midpoint of said rotor axis and being substantially surrounded by the rotor;
   d) a gap in the rotor at the approximate midpoint on the axis providing for coupling of a tethering component to the driven component;
   e) in combination said device having a rotor and means for coupling rotational energy from said rotor to the driven component, whereby the water powered device is positioned in a water current which produces a force on the blades and thereby rotate the rotor, wherein said rotor rotation transfers rotational energy to the driven component.

16. A water powered device as set forth in claim 15 wherein the driven component encircles the hub of said rotor, whereby the rotor hub is continuous for the length of said device.

17. A water powered device as set forth in claim 15 wherein the only physical connection to said device is a single tether comprising:
   a. a connection to an anchorage and providing the positioning said device in a current of water,
   b. a device for transporting items to and from said water powered device and said anchorage,
      whereby minimizing the number of physical connections to said device, reducing complexity and risk of entanglement.

18. A water powered device as set forth in claim 15 wherein the hub of said rotor provide substantially all of the buoyancy required to support the position of said water powered device relative to the surface of the water.

19. A method of obtaining energy from a current of water comprising:
   a) providing a non rotatable driven component with the capability of utilizing rotational energy in combination with providing protection from water;
   b) providing a rotor which will:
      1. provide substantially all the support required to maintain said water powered device position relative to the surface of the water by a group consisting of the hub and blades;
      2. provide a means to be placed about a axis perpendicular to the current and rotatable about the axis;
      3. provide a plurality of blades located on the outer peripheral surface of the hub of the rotor;
      4. provide for the driven device to be coupled directly with a tethering device,
   c) providing for the driven component to be positioned at the approximate midpoint on the axis and substantially within the rotor with approximate equal portions of the rotor located on opposing sides of the driven component;
   d) providing for said rotor to be coupled to said driven component;
   e) providing for transmitting of rotational energy from said rotor to said driven component, whereby said water powered device is placed within a moving body of water, where the currents apply force to said rotor's blades, rotating said rotor and transferring rotational energy to said driven component.

20. A method as set forth in claim 19 wherein the only physical connection to said device is a single tether comprising:

a) providing a connection to an anchorage and providing means of positioning said device in a current of water;
b) providing a device for transporting items to and from said water powered device and said anchorage, whereby minimizing the number of physical connections to said device, reducing complexity and risk of entanglement, wherein the transporting items comprises of at least one of the following:

i) electricity, data, communications;
ii) physical items such as coolant, water, compressed air; or
iii) mechanical means for transporting energy such as a drive shaft.

* * * * *